United States Patent [19]

Volz

[11] 4,282,423
[45] Aug. 4, 1981

[54] DEEP FAT FRYER HAVING A SOLID-STATE CONTROL CIRCUIT

[75] Inventor: Kenneth C. Volz, Crystal Lake, Ill.

[73] Assignee: International Foodservice Equipment Systems, Inc., Elgin, Ill.

[21] Appl. No.: 40,096

[22] Filed: May 18, 1979

[51] Int. Cl.³ .............................................. H05B 1/02
[52] U.S. Cl. .................................. 219/490; 219/492; 219/497; 219/442; 99/330; 99/337
[58] Field of Search ............... 219/490, 489, 492, 494, 219/497, 499, 501, 518, 251, 250, 506, 441, 442; 99/325, 337, 330, 331; 307/117

[56] References Cited

U.S. PATENT DOCUMENTS

| | | | |
|---|---|---|---|
| 3,492,459 | 1/1970 | Schwartz | 219/251 |
| 3,684,454 | 8/1972 | Martin et al. | 219/299 |
| 3,784,843 | 1/1974 | Gustus | 219/497 |
| 3,824,373 | 7/1974 | Napier | 219/442 |
| 3,842,243 | 10/1974 | Gregory | 219/497 |
| 3,877,359 | 4/1975 | Keating | 219/441 |
| 3,911,249 | 10/1975 | Keating | 219/441 |
| 3,919,523 | 11/1975 | Wadia et al. | 219/441 |
| 3,946,200 | 3/1976 | Juodikis | 219/497 |
| 3,955,067 | 5/1976 | Eldridge | 219/497 |
| 4,138,607 | 2/1979 | Engelmann | 219/497 |

*Primary Examiner*—Gerald P. Tolin
*Assistant Examiner*—M. Paschall

[57] ABSTRACT

A solid-state control circuit for selectively operating a deep fat fryer in a normal cook mode, a lower temperature hold mode, a fat melt mode and a safety thermostat test mode. During operation in the cook mode, a reference bias voltage is coupled to one input of a voltage comparator, and an operating bias voltage dependent on the temperature control setting and the actual cooking fat temperature sensed by a NTC resistive sensor is coupled to a second input of the comparator such that the comparator is effective to enable heating elements in the cooking fat when the fat temperature drops below the preset level. After a predetermined time interval during which the fryer is not being used, a timing circuit acts to vary the reference bias voltage and the operating bias voltage supplied to the comparator and thereby reduce the temperature of the fat to the lower preset hold mode temperature. A second comparator resets the timing circuit during the predetermined time interval if there is a demand for heat such as when frozen foodstuffs are placed in the cooking fat. In the melt mode, the timing circuit controls the first comparator such that the heating elements are cycled on and off to melt solidified cooking fat without scorching, and in the test mode, the temperature control potentiometer is bypassed to cause the first comparator to enable the heating elements to safely heat the cooking fat to a temperature where the safety thermostat and the safety contactor should function.

12 Claims, 5 Drawing Figures

DEEP FAT FRYER HAVING A SOLID-STATE CONTROL CIRCUIT

This is a continuation, of application Ser. No. 862,497 filed Dec. 29, 1977, now abandoned.

BACKGROUND OF THE INVENTION

This invention relates generally to cooking appliances, and more particularly, to a solid-state control circuit for selectively operating a cooking appliance such as a deep fat fryer in any one of several modes, including a substantially constant temperature cooking mode, a low temperature "hold" mode during periods of non-use, a "melt" mode during which solidified fat is melted, and a "test" mode during which the safety thermostat and the safety contactor are tested.

Restaurants, institutions and other food services typically use deep fat fryers for preparing fried foods such as French fried potatoes, seafood, chicken and the like. To insure that the food is fried uniformly and to the desired crispness without becoming greasy, it is important to maintain the temperature of the cooking fat constant during the cooking operation in the range between 275° Farenheit and 400° Farenheit. Accordingly, prior devices for deep fat frying food have commonly included an operating thermostat for sensing the temperature of the cooking fat and for opening and closing an operating contactor interposed in series with the heating elements to maintain the fat at the desired frying temperature.

Other apparatus has been suggested for performing functions which are generally related to those of the present invention, but which are substantially different. These include, for example, complex electronic timing circuits for alerting an operator that the food has been fully cooked, such as that shown in U.S. Pat. No. 3,995,067. There a thermistor comprising one leg of a resistance bridge is mounted in a probe immersed in the cooking fat. The bridge is coupled across a comparator which senses the output voltage from the bridge and generates an output signal varying with temperature. This temperature related output signal is then compared in a second comparator with the voltage across a charging capacitor in a resistance-capacitance network having a charging time constant corresponding to the elapsed time from the beginning of the frying cycle. Thus, for instance, the length of cooking time cycle will be increased when the food is cooked at a lower temperature and as the temperature is increased, the time of the cooking cycle will decrease. When the charging voltage from the resistance-capacitance network exceeds the temperature-related output signal from the first comparator, the second comparator generates a signal to alert an operator that the frying cycle is completed, and the operator must then remove the food from the fat.

Other arrangements have also been developed for use in connection with conventional ovens and microwave ovens. For example, U.S. Pat. No. 4,035,787 discloses apparatus including a temperature sensing thermistor in a probe adapted for insertion into the food being cooked in an oven. The apparatus uses a plurality of voltage divider networks for providing reference input and operating temperature input information to a comparator, the thermistor being connected in one of the voltage divider networks to control the condition of the comparator to interrupt the supply of power to the heating element upon completion of the cooking cycle. This particular apparatus, however, is not suitable for cycling the heating elements on and off to maintain a constant temperature. Rather, the temperature is maintained at a constant level by an operating thermostat.

Not only is it important to maintain a constant cooking temperature during the cooking operation, it is also advantageous for several reasons to be able to reduce the heat applied to the cooking fat and thereby decrease the time during which the heating elements need be energized during periods of non-usage. First, if the fat is maintained at high cooking temperatures throughout the day, even when the fryer is not being used, the fat deteriorates and must be replaced more frequently. If, on the other hand, the fat is allowed to cool to a lower temperature during non-peak periods of usage, the useful life of the fat is increased. Further, maintaining the cooking fat at the higher cooking temperature throughout the day requires more energy than if the fat is allowed to cool to a lower temperature level during non-usage. However, the fat must be maintained at some minimum temperature, for example, 200° Farenheit, so that the cooking fat can be reheated to the cooking temperature in a short time and does not solidify.

One such apparatus for maintaining the cooking fat at a lower temperature for an extended period of time is disclosed in U.S. Pat. No. 3,977,390 wherein the apparatus is manually switched to a standby condition by means of a toggle switch. It is desirable, however, to also provide means for automatically switching the appliance from the cooking mode to the lower temperature level mode after a predetermined time interval.

Another desirable feature is to provide means for adapting the fryer to melt solidified fat such as at the beginning of the day or whenever the fat is changed. When solidified fat is being melted, it is essential that the fat be heated slowly as it is melted. Rapid heating at high temperatures may cause the fat to burn and may overheat and damage those portions of the fryer which are heated but not immediately covered with melted fat, requiring replacement or costly repair.

Several prior devices have incorporated means for melting fat at a lower temperature. One such device which has been suggested is shown in U.S. Pat. No. 3,800,779 wherein the fry pot is provided with a melt thermostat which is responsive to the presence of a warm liquid shortening at a predetermined level in the container. The melt thermostat initially actuates a timer motor which functions to cylically actuate a bypass switch, thereby cyclically enabling and disabling a gas burner or an electric heating element. As soon as the fat in the fry pot has melted, the warm liquid shortening is detected by the melt thermostat which then functions to disable the timer motor. Thereafter, the regulation of the heat input to the fry pot is automatically transferred to conventional devices such as a high limit thermostat and an operating thermostat.

In the apparatus shown in U.S. Pat. No. 3,877,359, a melt cycle is provided by initially connecting the heating elements in series for a low heat melt cycle so that the fat is not burned during the start up period. The elements are then switched into a parallel arrangement for high heat cooking. The switch over from the low heat to the high heat modes can be manually actuated or can be temperature actuated, responsive to a thermostat, at a temperature just above the melting temperature of the fat.

Finally, although the optimum frying temperature is in the range between 275° Farenheit and 400° Farenheit, a malfunction in the circuitry of a deep fat fryer may result in the heating elements remaining on continuously to heat the cooking fat to temperatures in excess of 460° Farenheit to a point near the flash point of the fat. Prior deep fat fryers have commonly included a safety thermostat to open the contacts of a safety contactor responsive to the detection of an overheat condition. The safety thermostat opens the safety contactor contacts at a predetermined temperature above the normal cooking temperature to deenergize the heating elements and prevent the fat from reaching the flash point, i.e., 475° Farenheit, and igniting to cause a fire. In many prior art units, there is no means for routinely testing the safety thermostat or the safety contactor to verify that they are operable. Thus, if, for any reason, the safety thermostat or the safety contactor does become inoperative, it will not be discovered until there is a fire. Therefore, it is desirable to provide means for routinely checking the safety thermostat and the safety contactors to determine whether it is operational.

SUMMARY OF THE INVENTION

In accordance with the present invention, the solid-state control circuit hereinafter described is adapted for use in an appliance such as a deep fat fryer to obviate the aforementioned disadvantages of prior deep fat fryers and to facilitate the selective operation of such fryers in a "cook" mode wherein the cooking fat is maintained at a selected cooking temperature, a lower temperature "hold" mode, a fat "melt" mode, and a "test" mode wherein the safety thermostat and the safety contactor are safely tested.

More particularly, the solid-state control circuit of the present invention includes means comprising a plurality of resistors coupled in a voltage divider to develop a reference bias potential which is coupled to the first, or positive, input of a voltage comparator and means for developing an operating bias potential which is coupled to a second, or negative input of the comparator. The operating bias means includes an operating temperature control for selecting a temperature at which the cooking fat is to be maintained and a temperature sensing means, including a negative temperature coefficient resistive sensor, coupled in series with the operating temperature control to develop the operating bias potential at the junction between the operating temperature control means and the temperature sensing means. The operating bias potential varies responsive to changes in the temperature of the cooking fat sensed by the resistive sensor to correspond to the temperature of the cooking fat, and the voltage comparator develops an enabling signal whenever the level of the operating bias potential relative to the level of the reference bias potential indicates that the temperature of the cooking fat is below the temperature selected by means of the operating temperature control. Means are also provided for selectively energizing heating means including one or more heating elements to heat the cooking fat to the selected temperature responsive to the enabling signal from the comparator.

After a predetermined time interval during which the deep fat fryer is not in use, the solid-state control circuit is automatically shifted to operation in the "hold" mode. Timing means including an oscillator, a binary counter, gate means and first bistable means are actuated to bias off a transistor coupled in parallel with one of the resistors in the reference bias means to add additional resistance to the voltage divider and alter the reference bias potential applied to the comparator. Simultaneously, the timing means turns on a transistor coupled in parallel with the operating temperature control means to bypass a temperature control potentiometer and alter the operating bias potential supplied to the other input of the comparator. Responsive to the altered bias potentials supplied to the comparator, the comparator is inhibited from developing the enabling signal for energizing the heating means until the temperature of the cooking fat has been reduced to a lower temperature level, and thereafter, the comparator is enabled from time to time as necessary to maintain the temperature of the cooking fat at the reduced temperature level.

Means are also provided for automatically resetting the counter to initiate a new predetermined time interval if the deep fat fryer is used before the time interval has lapsed, the automatic resetting means comprising a second comparator having a first, or positive input coupled to the operating bias means and biased by the operating bias potential and a second, or negative, input coupled to the reference bias means and biased by a second, higher reference bias potential. The second comparator is biased such that the comparator will couple a reset signal to the counter restart the predetermined time internal to when fresh or frozen uncooked food is introduced into the cooking fat. Means are also provided for manually switching the solid-state control circuit to operate the deep fat fryer in the lower temperature hold mode and to reset the control circuit from operation in the hold mode to the higher temperature cook mode.

In the melt mode, a second bistable means, responsive to the timing means, develops a series of pulses which are coupled to a transistor coupled in parallel with the temperature sensing means to periodically short the temperature sensing means and alter the operating bias potential such that the first comparator is inhibited from developing an enabling signal. During these intervals, the heating elements are not energized and the comparator can only energize the heating elements to heat the cooking fat during short predetermined time intervals. Accordingly, during those intervals when the comparator is not inhibited the comparator remains subject to the control of the temperature sensing means, and should the heating element reach an excessive temperature, the comparator will be inhibited from producing the enabling signal until the temperature of the heating element has cooled sufficiently such that the cooking fat will not be adversely affected and the components of the deep fat fryer will not be damaged.

A preselected resistance is coupled to the temperature sensing means by a test mode switch to establish a new operating bias potential to the first comparator during operation in the "test" mode, and the operating temperature control is removed from the circuit by means of the test mode switch. Responsive to the change in the operating bias potential, the comparator is enabled to energize the heating elements until the cooking fat is safely heated to a temperature above the temperature where the safety thermostat and the safety contactor should function but below the flash point of the cooking fat. Indicator means are provided to give visual indication when the safety thermostat functions to deenergize the heating elements and second indicator means are provided to give a visual indication when the safety thermostat and the safety contactor do not function properly.

Accordingly, the solid-state control circuit of the present invention is effective to control the operation of a deep fat fryer in a normal cook mode and to maintain a selected cooking fat temperature for optimum cooking performance. The solid-state control circuit is also effective to automatically reduce the temperature of the cooking fat to a lower standby temperature level to conserve energy and extend the useful life of the cooking fat when the deep fat fryer has not been used for a predetermined interval. Moreover, the solid-state control circuit of the present invention provides means for safely melting solidified fat such as when the appliance is started after a period of nonuse, or when the cooking fat is replaced, while preventing the cooking fat from igniting or the heating elements from being over-heated and damaged. And in the test mode, the solid-state control circuit is operative to heat the cooking fat to a temperature level above that level where the safety thermostat and the safety contactor should function, but below the flash point of the fat, and provide a visual indication should the safety thermostat or the safety contactor fail to function.

BRIEF DESCRIPTION OF THE DRAWINGS

The features of this invention which are believed to be novel are set forth with particularity in the appended claims. The invention, together with its further objects and the advantages thereof, may be best understood, however, by reference to the following description taken in conjunction with the accompanying drawings, in which like reference numerals identify like elements in the several figures and in which:

DETAILED DESCRIPTION

Figure 1:
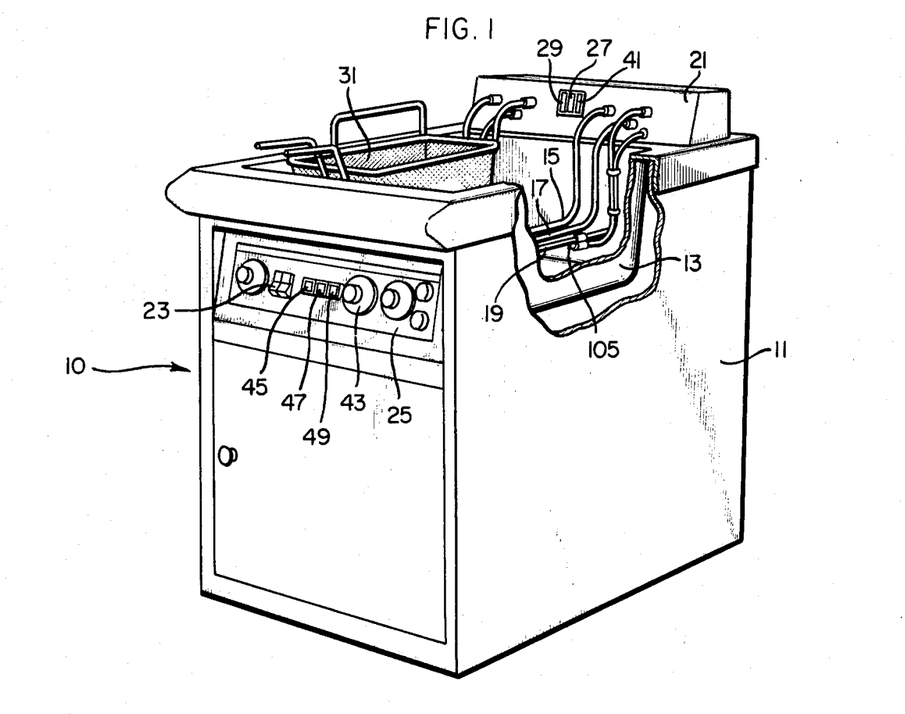
FIG. 1 is a perspective view of a typical commercial deep fat fryer incorporating the solid-state control circuitry of the present invention and in which portions of the fryer cabinet and the hot fat cooking well are partially broken away to show the location of the heating elements in the well.

With reference now to FIG. 1, the appliance 10 shown therein comprises a deep fat fryer for frying frozen foods or other uncooked foods such as French fried potatoes, seafood, chicken and the like, the deep fat fryer shown being especially adapted for use in commercial applications such as restaurant operations. Deep fat fryers such as the one shown in FIG. 1 typically include a cabinet 11 having a well 13 opening through the top wall of the cabinet for receiving and holding the reservoir of cooking fat, or cooking oil, in which the food is fried. Electric heating elements 15, 17, and 19 extend downwardly from a rear compartment 21 into the fat well 13 and thence forwardly near the bottom of the well to traverse the well, and alternating current (AC) electrical power is coupled to the heating elements through a main on/off switch 23 located on a control panel 25 provided on the front of the cabinet. In the particular embodiment illustrated in FIG. 1, a green indicator light 27 is provided on the front of the compartment 21 to give a visual indication, when lighted, that the appliance is on and that electrical power is being supplied to the appliance, while an amber indicating light 29 lights when the heating elements 15, 17 and 19 are energized. Thereafter, when the fat has reached the desired cooking temperature, the uncooked food is loaded into baskets such as basket 31 and lowered into the hot cooking fat in the well and fried.

Figure 2:
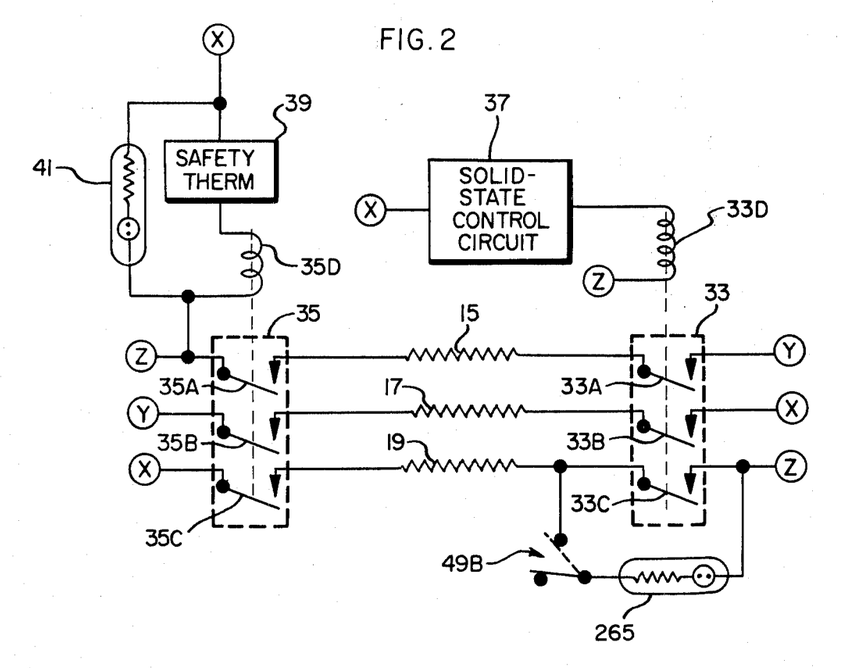
FIG. 2 is a schematic diagram showing circuitry associated with the heating elements in relation to the solid-state control circuit of the present invention.

The heating elements 15, 17 and 19, which are typically of the sheathed type, are coupled through the main on/off switch 23 to a three-phase AC electrical power source (not shown) providing electrical power at, for example, 208, 240, or 480 volts, depending on the power requirements of the heating elements. In particular, the three-phase AC power source is coupled to internal power supply lines in the deep fat fryer, and as illustrated in FIG. 2, the heating elements 15, 17 and 19 are coupled to the internal AC power supply lines X, Y and Z in typical three-phase power circuits. An operating contactor 33 having individual normally open contacts 33A, 33B, and 33C and a safety contactor 35 having individual normally open contacts 35A, 35B, and 35C are coupled in series with the heating elements. The contactors 33 and 35 also have respective coils 33D and 35D coupled to the AC power supply lines, e.g., X and Z, and when electrically energized, the coils close the corresponding contacts of the contactors to energize the heating elements and thereby heat the cooking fat.

During normal operation, the safety contactor coil 35D is continuously energized to maintain the safety contactor contacts 35A, 35B and 35C closed while the operating contactor coil 33D is selectively energized and deenergized by the solid-state control circuit 37 of the present invention as hereinafter described to enable and disable the heating elements 15, 17 and 19 and maintain a desired fat temperature for cooking purposes. A safety thermostat 39 is interposed in series with the safety contactor coil 35D and includes means for sensing the temperature of the cooking fat. Responsive to an overheat condition when, for example, the temperature of the fat reaches 460° Farenheit, the safety thermostat 39 opens the circuit between the safety contactor coil 35D and the AC line to deenergize the safety contactor coil and allow the safety contactor contacts 35A, 35B and 35C to reopen thereby deenergizing the heating elements and permitting the fat to cool. A red indicator light 41 mounted on the front of compartment 21 is coupled between AC power supply lines X and Z in parallel with the safety contactor coil 35D and the safety thermostat 39 to light and provide a visual indication when the safety thermostat 39 opens the safety contactor coil circuit due to an overheat condition.

The solid-state control circuit 37 allows the appliance to be operated in any one of four modes of operation, to wit: (1) a "cook" mode wherein a desired fat temperature can be set by means of an adjustable, temperature calibrated control knob 43 on the control panel and wherein the heating elements are thereafter energized and deenergized as required to maintain the cooking fat at the selected temperature; (2) a "hold" mode in which the temperature of the fat is automatically reduced to a second lower temperature level such as 200° Farenheit independently of the normal "cook" temperature selected by means of control 43; (3) a "melt" mode for melting solidified cooking fat whereby the electric heating elements are cycled on and off to provide partial heat output to minimize the chance of fire or scorching of the fat should melted fat drop on a portion of the heating element which is heated but not immersed in melted cooking fat; and (4) a "test" mode wherein the temperature of the fat is safely heated to a level above that where the safety thermostat 39 opens, e.g., to 460° Farenheit, but below the flash point of the fat, i.e., approximately 475° Farenheit.

During typical usage, the fryer is operative in the "cook" mode when food is being deep fat fried on a continuing basis. However, if food has not been placed in the fryer for a substantial period of time, e.g., one hour, the solid state control circuit 37 acts to automatically switch the fryer into the "hold" mode wherein the temperature is reduced to the lower temperature level. Alternatively, the fryer can be manually switched into the "hold" mode by depressing a switch 45 on the front panel 25. Additional switches 47 and 49, also on the front panel 25, are provided to manually switch the fryer into the "melt" and "test" modes, respectively. As hereinafter described, each of switches 45, 47 and 49 individually comprise multiple ganged sections, i.e., 45A and 45B, 47A and 47B, and 49A and 49B, and further incorporate indicator lights which, when lighted, provide a visual indication identifying the particular mode in which the fryer is operative.

Figure 3A:
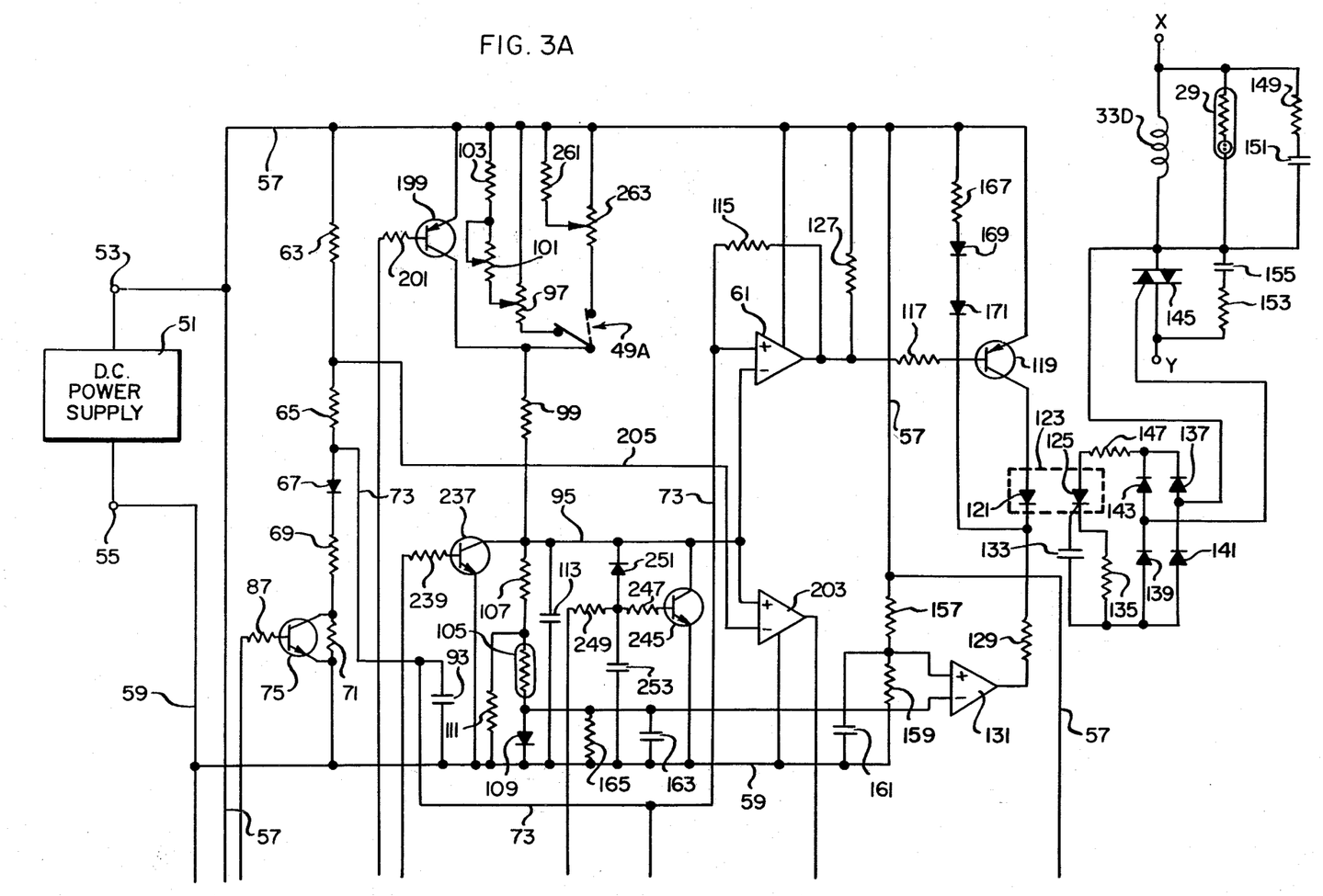
FIGS. 3A and 3B, in combination, comprise a schematic diagram of one embodiment of the solid-state control circuit.
Figure 3B:
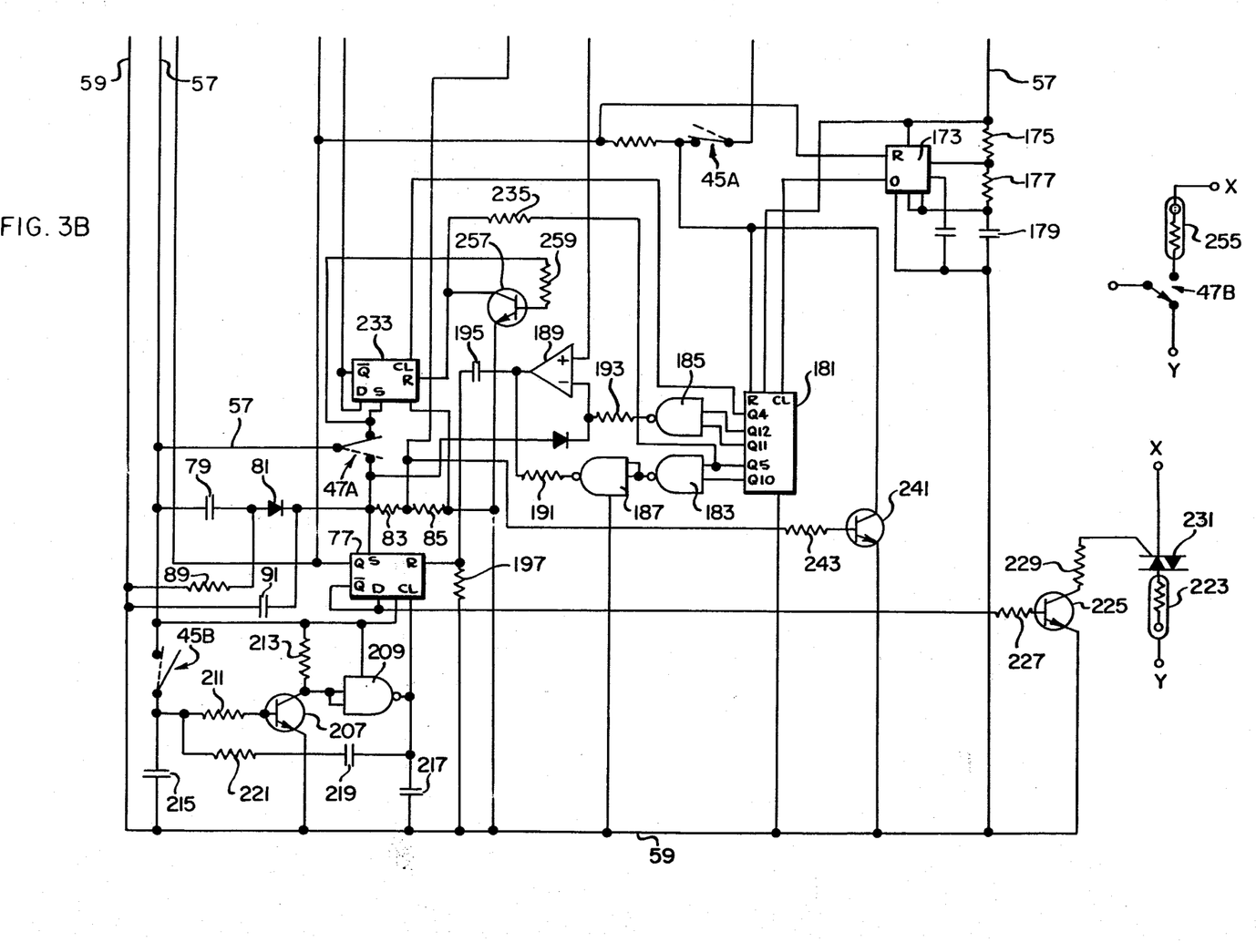

With reference now to FIGS. 3A and 3B, direct current (DC) power is supplied to the solid-state control circuit by a regulated, solid-state DC power supply 51, which is coupled to the internal AC power lines, e.g., AC lines X and Y. The DC electrical power supply 51 converts the input AC voltage to a direct current (DC) voltage in the well-known manner and establishes a 12 volt DC differential between its output terminals 53 and 55 and respective supply lines 57 and 59 of the solid-state control circuit coupled thereto.

In FIG. 3A, the solid state control circuit 37 of the present invention can be seen to include a voltage comparator 61 which is utilized during operation in each of the operative modes as a means for controlling the energization and deenergization of the electric heating elements 15, 17 and 19 in accordance with the particular mode of operation selected. Inputs to the comparator 61 are derived from a reference bias circuit which provides a reference voltage to the positive input of the comparator and from an operating bias circuit which provides an operating voltage to the negative input of the comparator, the operating voltage varying responsive to the sensed temperature of the cooking fat and the closely proximate heating element.

In the particular embodiment shown in FIGS. 3A and 3B, the reference bias circuit comprises a voltage divider network having resistors 63 and 65, signal diode 67, and resistors 69 and 71 coupled in series between the 12 volt DC power supply line 57 and the reference power supply line 59, the junction of resistor 65 and signal diode 67 being coupled to the positive input of the voltage comparator 61 via line 73.

During operation in the "cook" mode, a transistor 75 having its collector-emitter junction coupled in parallel with resistor 71 is turned "on" by a "D" flip-flop 77 and resistor 71 is effectively shorted from the reference bias circuit. In particular, the set (S) input of the flip/flop 77 is coupled to the 12 volt DC supply line 57 by a capacitor 79 and a diode 81 and to the reference power supply line 59 by resistors 83 and 85. The initial energization of the DC power supply 51 when the appliance is turned on produces a voltage pulse which is coupled to the set (S) input through capacitor 79 and diode 81 to set the Q output of flip/flop 77 to its high logic level state. The high logic signal on the Q output is, in turn, coupled to the base of transistor 75 through resistor 87 to initially bias the transistor to conduction and short resistor 71. Resistor 89 provides a bleeder for capacitor 79, and capacitor 91 provides additional filtering for the set (S) input to flip/flop 77. The resulting reference voltage applied to the comparator is filtered by a capacitor 93 coupled between line 73 and the reference supply line 59 of the DC power supply and establishes the level of voltage which must be applied to the negative input of the comparator 61 in order to switch the comparator to its low logic level state.

Simultaneously, the variable operating bias voltage representative of the selected cooking temperature and the actual temperature of the cooking fat is coupled to the negative input of the comparator 61 by line 95 from the operating bias circuit.

The operating bias circuit comprises a cooking temperature control circuit and a temperature sensing circuit connected in a voltage divider network between the DC power supply lines 57 and 59. The cooking temperature control circuit includes a temperature control potentiometer 97 which is coupled in series with switch section 49A of the test mode switch 49 and a resistor 99 between the 12 volt DC power supply line 57 and line 95 to establish the first resistance leg of the voltage divider network, the potentiometer 97 being adjustable by means of control knob 43 to passively vary the voltage developed on line 95 and thereby select a desired cooking temperature. A calibration potentiometer 101 and a resistor 103 are coupled in series between the wiper arm of the potentiometer 97 and the 12 volt line 57 of the DC power supply, and when the heating elements are at a temperature corresponding to the setting of control 43, the resistance of the calibration potentiometer 101 is adjusted such that the voltage developed on line 95 is substantially equal to the reference bias applied to the positive input of comparator 61. This initial calibration will preferably be made at the factory or during the initial set-up of the appliance when it is installed. Thereafter, the comparator 61 remains at its operation threshold as long as the cooking fat is at the desired temperature, and when the temperature control potentiometer 97 is adjusted to a new temperature setting, the passive voltage level on line 95 will also change to adjust the operational threshhold of comparator 61 to correspond to the new temperature setting that has been selected.

Responsive to deviations of the actual fat temperature from the selected temperature during operation of the appliance, the voltage on line 95 is also varied dynamically by the temperature sensing portion of the voltage divider network to maintain the cooking fat at the temperature level selected by means of the temperature control potentiometer 97.

More particularly, the temperature sensing circuit comprises, for example, a negative temperature coefficient (NTC) resistive sensor 105 secured to one of the heating elements in the well, e.g., heating element 19, and coupled to the solid-state control circuit 37 in series with a resistor 107 and a diode 109 between line 95 and the reference power supply line 59. As the temperature of the heating element 19 and the cooking fat varies from the selected temperature, the resistance of the sensor 105 varies inversely, increasing as the temperature of the fat decreases and decreasing as the fat temperature increases.

Accordingly, the bias voltage developed on line 95 at the junction of resistors 99 and 107 and applied to the negative input of comparator 61 increases as the fat temperature decreases and the resistance of sensor 105 increases while the bias voltage decreases as the fat temperature increases and the resistance of the sensor decreases. Because the operating characteristics of the negative temperature coefficient sensor 105 are logarithmic with respect to the sensed temperature, a resistor 111 is connected in parallel with the sensor 105 and diode 109 to provide a more linear response over the operating temperature range of the appliance. A capacitor 113 coupled between line 95 and the reference supply line 59 filters the DC bias potential supplied to the negative input of comparator 61.

In operation, the bias applied to the negative input of comparator 61 increases to equal or exceed the reference bias applied to the positive input when the temperature of the cooking fat drops below the selected temperature, and the comparator provides a low logic level enabling signal at its output. Conversely, the comparator 61 is switched to its non-enabling high logic level state when the cooking fat temperature exceeds the selected cooking temperature and the bias applied to the negative input is less than the reference bias applied to the positive input of the comparator. A resistor 115 coupled between the output and the positive input of comparator 61 provides hysteresis to prevent the output signal of the comparator from oscillating when the fat temperature is at or near the control temperature setting.

The output of the comparator 61, in turn, is coupled through a resistor 117 to the base of a PNP transistor 119 having its emitter electrode coupled to the 12 volt DC supply line 57 and its collector coupled to the input light emitting diode 121 of an isolator 123 having an optically isolated silicon-controlled rectifier (SCR) 125. A resistor 127 coupled between the 12 volt DC power supply line 57 and the output of comparator 61 combines with resistor 117 to provide a bias network which turns transistor 119 "on" when the output of the comparator 61 is low, i.e., the sensed fat temperature is below the desired control setting, and "off" when the output of comparator 61 is high corresponding to the sensed fat temperature being at or above the desired temperature setting. When transistor 119 is conductive, a current path is established through the emitter-collector junction of transistor 119 and the light emitting diode 121, the current path being completed through a resistor 129 coupled between the cathode of diode 121 and the open collector output of a second comparator 131.

When the input diode 121 is conductive, responsive to a low fat temperature condition, the diode emits infrared radiation which is directed toward the optically isolated silicon controlled rectifier (SCR) 125. The resulting gate current in the SCR charges a capacitor 133 coupled in parallel with a resistor 135 and connected to the gate electrode of the SCR until the the capacitor 133 is charged sufficiently to trigger the SCR 125 to conduction. The SCR, in turn, is coupled in series with the operating contactor coil 33D through a bridge rectifier circuit comprising diodes 137, 139, 141 and 143. One end of the operating contactor coil 33D is coupled to the AC line, X, while its other end is coupled to the junction of diodes 137 and 141 and to a triac 145 coupled to the other AC line, Y. On the positive portion of each AC voltage cycle, AC current is coupled to the bridge rectifier and a current path is established through diode 137, resistor 147, SCR 125 and diode 139 to the gate electrode of the triac 145 while on the negative portion of each cycle, current flow to the gate electrode of the triac is through diodes 143 and 141, SCR 125 and resistor 147. Upon triggering of the SCR 125 responsive to a low fat temperature condition, a DC gate current is supplied to the triac 145 and the triac is triggered to conduction. The operating contactor coil 33D is then coupled between the AC lines, X and Y, through triac 145 and energized during the time that SCR 125 remains conductive. Upon energization of the contactor coil 33D, the contactor contacts 33A, 33B and 33C close to permit energization of the heating elements 15, 17, and 19 for heating the cooking fat.

Thereafter, the temperature of the cooking fat sensed by the sensor 105 increases until it is equal to or greater than the desired control setting and the operating voltage on line 95 is slightly less than or equal to the reference voltage on line 73, and the output of the voltage comparator 61 goes to the high logic level state to switch transistor 119 off and open the current path to diode 121. The SCR 125 is then switched off and the triac 145 similarly turns off to disconnect the operating contactor coil 33D from the AC power lines and deenergize the heating elements.

The amber indicator light 29, which as previously mentioned provides a visual indication whenever the heating elements are energized, is coupled in parallel with the operating contactor coil 33D and lights when the operating contactor coil 33D is energized. A resistor 149 and a capacitor 151, connected in series, are also coupled in parallel with the indicator light 29 and a resistor 153 and a capacitor 155, also serially connected, are coupled in parallel with triac 145 to reduce the effect of transient voltages, such as those resulting from lightning discharges, and eliminate flickering by the indicating light 29.

In addition to providing a current path for the light emitting diode, comparator 131 also functions to disable the appliance if the sensor 105 should become open-circuited or short-circuited. To that end, a fixed bias potential is established on the positive input of the comparator 131 by a resistive network comprising resistors 157 and 159 connected between supply lines 57 and 59, the positive input of the comparator 131 being coupled to the junction of resistors 157 and 159 and bypassed to line 59 by a capacitor 161, while the negative input of the comparator 131 is coupled to the junction between the sensor 105 and the diode 109 in the temperature sensing portion of the operating bias circuit. The negative input of the voltage comparator 131 is biased by the forward voltage drop developed across the diode 109 and filtered by capacitor 163 and resistor 165 coupled in parallel between the negative input of the comparator 131 and the reference supply line 59. Thus, if an open circuit condition should occur in the sensor 105, no bias voltage is supplied to the negative input of the voltage comparator 131 and its output goes to the high logic level state. Since comparator 131 is an open collector device, the comparator is accordingly biased off to open the output circuit of transistor 119 and current flow through the transistor and the input diode 121 of the isolator is interrupted to remove electrical power from the operating contactor coil 33D regardless of the temperature of the fat. Also, should the sensor 105 become short-circuited, the operating bias voltage at the negative input of comparator 61 is less than the reference potential supplied to the positive input of the comparator, causing the output of voltage comparator 61 to go to its high output state and turn transistor 119 off to remove the input current supplied to the input diode 121 such that no current is applied to the contactor coil 33D.

To provide uniform current drain for the circuit and thus provide better power supply regulation during those time intervals when transistor 119 is nonconductive, a resistor 167 and signal diodes 169 and 171 are coupled between the 12 volt DC power supply line 57 and the junction of the light emitting diode 121 and resistor 129.

When the cooking fat has been at the selected operating temperature for a predetermined time interval and the fryer has not been used during that interval, the solid-state control circuit automatically switches the appliance into the lower temperature "hold" mode of operation to conserve energy and extend the useful life of the fat. The circuitry required to place the solid-state control in the "hold" mode includes an oscillator 173 having resistors 175 and 177 and capacitor 179 coupled in series between its positive and negative terminals to function as timing components causing the oscillator to generate timing pulses at one second intervals at its ouput (O). The oscillator 173, in turn, supplies a series of output pulses at one second intervals to the clock (CL) input of a binary counter 181 coupled to the output of the oscillator. In the particular embodiment described herein, outputs Q5, Q10, Q11, and Q12 of the counter 181 are all switched to their respective high logic level states after one hour when a total of 3,600 pulses have been received from oscillator.

The Q5 and Q10 outputs of the counter 181 are coupled to the inputs of a NAND gate 183, while the Q11 and Q12 outputs of the counter are coupled to the corresponding inputs of NAND gate 185. Output of 183 is coupled to the inputs of a third NAND gate 187 having its output coupled to the output of a comparator 189 by resistor 191, and the output of NAND gate 185 is resistively coupled to the negative input of the comparator 189 by resistor 193. The positive input of comparator 189 is coupled to the reference bias line 95 of the reference bias circuit.

Accordingly, after the deep fat fryer has operated uninterrupted for one hour in the "cook" mode without demand for cooking heat, the resulting high logic level states of the Q5, Q10, Q11, and Q12 outputs counter 181 are decoded by the NAND gates 183, 185 and 187 in conjunction with the comparator 189 to provide a single pulse at the output of comparator 189. This pulse is then AC coupled through a capacitor 195 to the reset (R) input of flip/flop 77, the reset input of flip/flop 77 also being coupled to the reference power supply line 59 by resistor 197, to reset the flip/flop 77 and causes the Q output thereof to go to the low logic level state to turn transistor 75 off and unshort resistor 71 in the reference bias circuit.

Simultaneously, a transistor 199 coupled between resistor 99 and the 12 volt DC power supply line 57 in parallel with the temperature control potentiometer 97 is biased "on" through resistor 201 from the Q output of flip/flop 77. When transistor 199 is conductive during operation in the "hold" mode, the operating temperature control potentiometer 97 and the calibration potentiometer 101 are effectively shorted from the operating bias circuit to establish a new operating bias potential on line 95 which is independent of the setting of the temperature control potentiometer 97. The resulting lower reference bias voltage applied to the positive input of comparator 61 together with the higher operating bias established at the negative input of the comparator when the temperature control and calibration potentiometers are shorted are preselected to cause the comparator 61 to remain in its high logic level state until the temperature of the fat falls, for example, to a temperature of 200° Farenheit, and comparator 61 will not enable the transistor 119 until such time as the cooking fat temperature sensed by sensor 105 has dropped below the 200° Farenheit temperature level. Upon reaching that level, the comparator 61 is cycled on and off in the manner heretofore described in connection with operation in the "cook" mode to maintain the temperature of the cooking fat at the lower temperature level. The solid state control circuit will thereafter maintain the appliance in the "hold" mode of operation at the lower temperature until the appliance is reset manually to the "cook" mode by means of switch 45.

If there is demand for cooking heat while the appliance is operating in the "cook" mode, however, such as when uncooked or frozen food is placed in the cooking fat, a use comparator 203 generates an output signal which provides the portion of the solid-state circuit associated with the "hold" mode of operation with information that there is a demand for heat. To that end, in addition to providing the reference bias voltage coupled to the positive input of comparator 61, the reference bias circuit also provides a second, slightly higher reference, or demand, bias voltage at the junction of resistors 63 and 65 which is applied to the negative input of comparator 203 via line 205. The positive input of comparator 203 is connected to line 95 carrying the operating bias voltage, and accordingly, the voltage supplied to the positive input of comparator 203 also varies with changes in the fat temperature sensed by the sensor 105. Typical variations in the operating bias voltage applied to comparator 61 during normal operation in the "cook" mode are not sufficient to switch the output of the use comparator 203 to its high logic level state. However, if a large heat demand is made of the heating elements, the fat temperature cools significantly and the resistance of the sensor 105 increases, such that the operating bias voltage is sufficient to cause the output of the use comparator 203 to go to the high logic level state. This high level signal, representing fryer use, is coupled to the reset (R) input of the counter 181 through the normally closed hold switch 45A to reset the counter and allow the solid-state control circuit to remain in the "cook" mode for an additional hour.

Once the appliance is in the "hold" mode, however, it can only be reset to the "cook" mode by depressing the hold switch 45 on the control panel 25. Conversely, the appliance can also be manually shifted from the "cook" mode to the "hold" mode by depressing the normally open switch 45B which is coupled to a transistor 207 and a NAND gate 209 interconnected in a monostable multivibrator configuration coupled to the clock (CL) input of flip/flop 77. More particularly, the normally open switch 45B is interposed in the line from the 12 volt DC power supply line 57 and coupled to the base of transistor 207 by resistor 211, while the emitter electrode of transistor 207 is connected to the reference power supply line 59. The collector electrode of transistor 207, in turn, is coupled to the 12 volt DC power supply line 57 through a resistor 213 and also to the inputs of NAND gate 209. A capacitor 215 coupled between the reference power supply line 59 and the junction of a resistor 211 and switch section 45B filters "bounce" from the switch, while a capacitor 217 removes noise from the pulse coupled to the clock (CL) input of flip/flop 77. The clock pulse from the output of NAND gate 209 is also coupled back to the base electrode of transistor 207 through capacitor 219 and resistors 221 and 211 to further debounce the switch. Accordingly, when switch 45B is manually closed by depressing the hold switch 45, transistor 207 is turned on and gate 209, in turn, couples a high logic level signal from its output terminal to the clock (CL) input of flip/flop 77. Since the D input of flip/flop 77 is coupled to the Q output thereof, the pulse applied to the clock input of flip/flop 77 causes the Q output of the flip/flop to go to its opposite state. Thus, if switch 45 is depressed while the appliance is in the "cook" mode, transistor 75 is turned off and transistor 199 is turned on to shift the appliance into the "hold" mode. Conversely, if the appliance is already in the "hold" mode, transistor 199 is turned off and transistor 75 is turned on to switch the appliance to the "cook" mode.

When resetting the appliance from the "hold" mode to the "cook" mode, however, it is necessary to disconnect the output of comparator 203 from the reset (R) input of the counter 181 to insure that counter is reset at that time, and accordingly, this is accomplished when normally closed switch 45A is momentarily opened by depressing the hold switch 45.

Finally, an indicator light 223 located in the "hold" mode switch 45 lights to provide a visual indication when the appliance is operative in the "hold" mode. In particular, the base electrode of a NPN transistor 225 is coupled to the Q output of flip/flop 77 by resistor 227, the emitter electrode of the transistor being coupled to the reference power supply line 59 while the collector electrode is coupled through resistor 229 to the gate electrode of a triac 231 coupled in series with indicator light 223 between AC power lines X and Y. Accordingly, when the Q output of flip/flop 77 is low, i.e., in the "hold" mode, the $\overline{Q}$ output is high and transistor 225 is conductive to supply gate current to the triac 231. Responsive thereto, triac 231 is turned on to allow current to flow through the indicator light 223 and provide the aforementioned visual indication that the appliance is operating in the "hold" mode.

Operation in the "melt" mode is achieved by depressing switch 47 such that one section of the switch, 47A, is switched to the position indicated by the dashed line in the drawing to couple the set (S) input of flip/flop 77 to the 12 volt DC power supply line and place the Q output thereof in the high logic level state. This high logic level signal, in turn, is coupled from the Q output of flip/flop 77 to the reset (R) input of the oscillator 173 to reset the oscillator and enable it to generate the one second timing pulses supplied to the clock (CL) input of the binary counter 181. The Q4 output of counter 181, corresponding to a count of eight seconds, is also coupled to the clock (CL) input of a second "D" flip/flop 233, while its Q5 output, representing a count of sixteen seconds, is coupled through resistor 235 to the reset (R) input of flip/flop 233.

Figure 4:
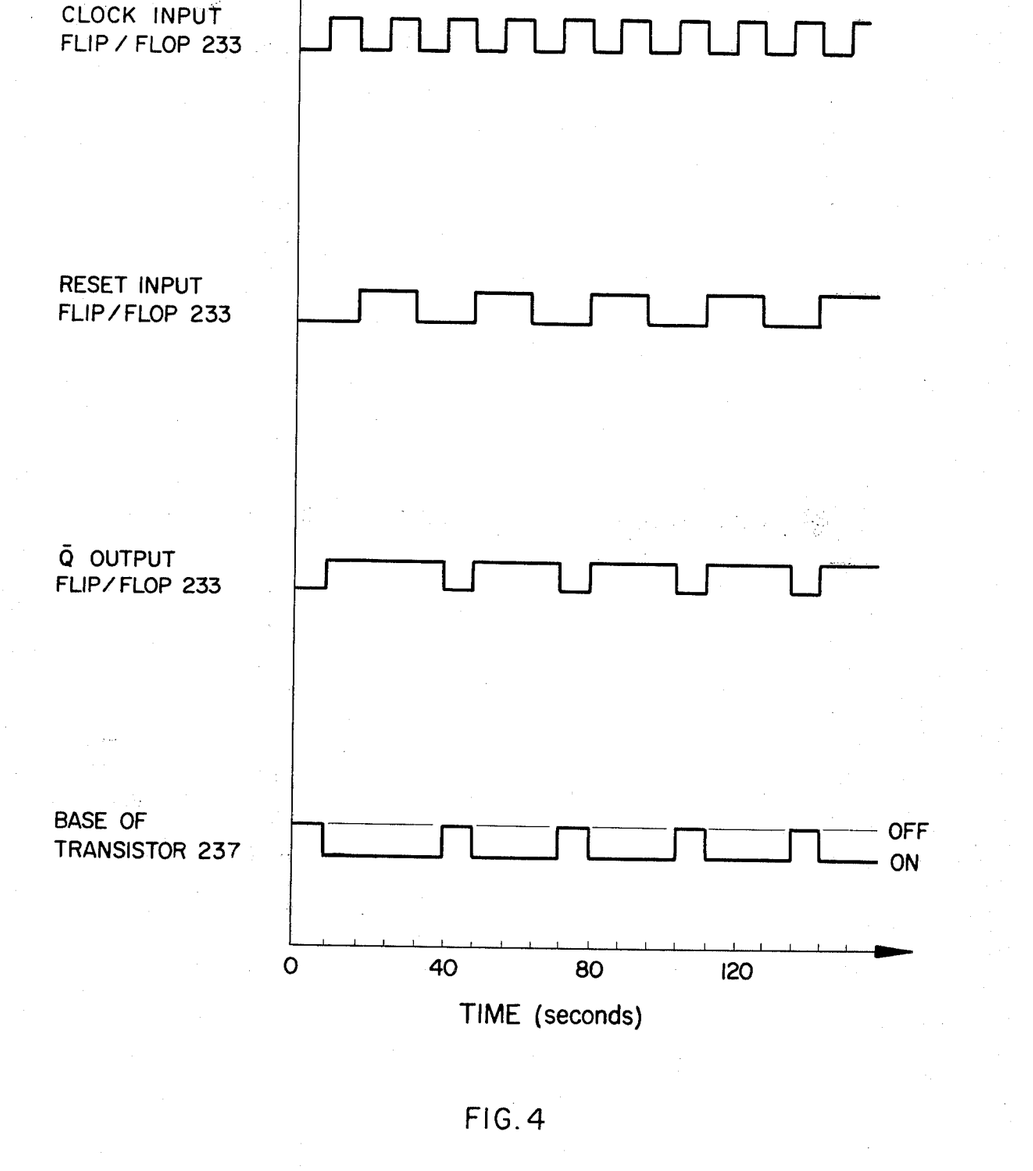
FIG. 4 illustrates the output signals of various components of the solid-state control circuit utilized during the "melt" mode of operation.

As illustrated in FIG. 4, after an elapsed time interval of eight seconds and responsive to receiving eight pulses from the oscillator 173, the Q4 output of counter 181 is switched to the high logic level state which is transferred as a clock pulse to flip/flop 233. Upon receipt by the flip/flop of the clock pulse from the counter 181, the $\overline{Q}$ output of flip/flop 233 is switched to its high logic level state to turn on a transistor 237 coupled to the $\overline{Q}$ output of the flip/flop by resistor 239. The transistor 237 has its collector-emitter junction coupled between the operating bias line 95 and the reference power supply line 59, and accordingly, transistor 237, when conductive, shorts the temperature sensing portion of the operating bias circuit. This, in effect, couples the negative input of comparator 61 to the reference power supply line 59, and the voltage comparator 61 responds as if the operating temperature has been reached, turning transistor 119 off and deenergizing the heating elements 15, 17 and 19.

Eight seconds later, after a total elapsed time of sixteen seconds, the Q5 output of binary counter 181 switches to its high logic level state to provide a high level input to the reset (R) input of flip/flop 233. This first, but only the first, reset signal does not affect the condition of flip/flop 233, and transistor 237 remains conductive so that no power is supplied to the heating elements. The reset signal is applied to the reset (R) input of flip/flop 233 for the next sixteen seconds to inhibit further clock pulses from forcing the flip/flop to turn transistor 237 off, but eight seconds later, after the removal of the reset (R) pulse, a third clock pulse is coupled to flip/flop 233 and, in the absence of a reset pulse, this time the clock pulse switches the Q output of flip/flop 233 to its low logic level state to turn transistor 237 off. The solid state control circuit is then allowed to function normally for the next eight seconds until counter 181 resets the $\overline{Q}$ output of flip/flop 233 to its high level condition to again enable transistor 237 and the heating elements. The heating elements 15, 17 and 19 will then remain off for the next twenty-four seconds. Thus, during the first timing interval of the "melt" cycle, the solid state control circuit functions normally for eight seconds and remains off for the next thirty-two seconds and then, during the next and each succeeding time interval, the control circuit functions normally, subject to control by sensor 105, to allow the heating elements to be energized for eight seconds and then functions to deenergize the heating elements for the following twenty-four seconds.

Accordingly, in the "melt" mode, solidified fat can be safely melted when the appliance is initially turned on or when old fat is replaced at the end of its useful life with new fat. Because the heating elements are allowed be cycled on only for short intervals during which they are subject to control by the comparator 61 responsive to the sensor 105, the heating elements do not become sufficiently hot to burn the cooking fat before the level of the melted fat in the well covers the heating elements and the exposed heating elements do not become sufficiently hot to damage themselves.

Reset pulses to the counter 181 are inhibited during operation in the "melt" mode so that no disruption of the timing cycle occurs. For this purpose, a bias transistor 241 is connected with its collector-emitter junction coupled between the reset (R) input of counter 181 and the reference power supply line 59 and with its base electrode coupled through resistors 243 and 83 and switch 47A to the 12 volt DC power supply line 57. Accordingly, when the appliance is operating in the "melt" mode, transistor 241 is turned on to short the reset (R) input of counter 181 to the reference power supply line 59 and inhibit the reset pulses from resetting the counter.

As a safety measure, to insure that the heating elements do not continue to receive power should any component in the timing circuitry fail, the collector electrode of an NPN transistor 245 is coupled to the operating bias line 95 and its emitter electrode is coupled to the reference power supply line 59 while its base is coupled to the 12 volt DC power supply line 57 through resistors 247, 249 and 83, and the hold mode switch 47A. The junction of resistors 247 and 249 is coupled to the operating bias line 95 by a signal diode 251 and to the reference power supply line 59 by a capacitor 253. Thus, when switch 47A is closed to the "melt" position, capacitor 253 charges through resistors 83 and 249. If the "melt" circuitry is functioning properly, capacitor 253 is discharged at the end of eight seconds through the signal diode 251 and transistor 237. If, on the other hand, the timing circuitry should fail for any reason, capacitor 253 continues to charge and biases transistor 245 to conduction. When transistor 245 is conductive, the operating bias voltage applied to the negative input of comparator 61 is lowered to a point where transistor 119 shuts off to remove the power to the heating elements 15, 17 and 19, and the solid-state control circuit remains off until the problem has been corrected.

In addition, when the melt mode switch 47 is depressed to shift the deep fat fryer to operation in the "melt" mode, switch 47B closes as indicated to apply power to an indicator light 255 in the switch 47 on the front panel 25 and thereby indicate that the appliance is operating in the "melt" mode.

To inhibit the "melt" mode portion of the solid-state control circuit during operation in the other modes, the collector-emitter junction of a transistor 257 is coupled between the reset (R) input of flip/flop 233 and the reference power supply line 59 and the base electrode of the transistor is coupled through resistor 259 to the set (S) input of flip/flop 233. During operation in the "melt" mode, the set (S) input of flip/flop 233 is disconnected from the 12 volt DC power supply line 57 by switch 47A and transistor 257 is nonconductive. Thus, reset pulses can be coupled to flip/flop 233, and the "melt" mode circuit is free to operate. In the other modes of operation, however, the 12 volt DC power supply line is coupled through the melt mode switch 47A to the set (S) input of flip/flop 233 and the resulting bias applied to the base electrode of transistor 257 turns the transistor on to effectively hold the reset (R) input of the flip/flop at the reference voltage level and inhibit the operation of the "melt" mode circuit.

As previously stated, the solid-state control circuit of the present invention is also operable in a "test" mode wherein the safety thermostat 39 and the safety contactor 35 are tested. Specifically, the "test" mode circuit includes a resistor 261 coupled between the 12 volt DC power supply line 57 and the wiper arm of a potentiometer 263 having one end coupled through one section 49A of a test switch 49 to resistor 99 and its other end coupled to the 12 volt DC power supply line 57. When test switch 49 on the front panel is depressed, the temperature selection potentiometer 97 is removed from the circuit and the test circuit comprising resistor 261 and potentiometer 263 is substituted therefor. The potentiometer 263 is preferably calibrated at the factory, or prior to installation, to alter the potential on the operating bias line 95 coupled to the negative input of the comparator 61 such that comparator 61 enables the operating temperature, e.g., 460° Farenheit, before the heating elements are then deenergized. At its rated temperature, e.g., 450° Farenheit, the safety thermostat functions to deenergize the safety contactor coil 35D and open the safety contactor contacts 35A, 35B and 35C, thereby deenergizing the heating elements 15, 17 and 19.

As illustrated in FIG. 2, a high resistance indicator light 265 in the test switch 49 is coupled in series with the second section 49B of the test switch 49 to parallel one of the operating contactor contacts, e.g., contactor contact 33C, when the test switch is actuated. During testing, electrical power is applied to the heating elements 15, 17, and 19 through the closed contacts 33A, 33B, 33C of the operating contactor and the closed contacts 35A, 35B, 35C of the safety contactor. If the safety thermostat 39 functions properly, the red indicator light 41 on panel 25 lights when the safety thermostat 39 opens and the safety contactor contacts 35A, 35B, 35C open to deenergize the heating elements. Should the thermostat 39 fail to function before the fat reaches 460° Farenheit, however, the contacts 33A, 33B and 33C open when the fat temperature reaches 460° Farenheit and the solid-state control circuit, i.e., comparator 61, deenergizes the heating elements. If the operating contactor contacts 33A, 33B, 33C open before the safety thermostat functions, current is then supplied to the high resistance indicator light 265 in parallel with the open contact 33C. The indicator light 265 then lights to provide a visual indication that the safety thermostat 39 did not function properly within its rated temperature and that its calibration should be checked. Also, if the panel light 41 lights, indicating that the safety thermostat 39 is functioning properly, but the indicator light 265 in the test switch 49 also lights, it is an indication that the safety contactor contacts 35A, 35B, 35C have failed to open properly and should be repaired or replaced before the appliance is used again. As an additional safety feature, operation in the "test" mode requires the continuous presence of an operator to manually hold the test switch closed and observe the unit as the temperature of the cooking fat is increased, the time interval during which the test switch must be held closed optimumly not exceeding 2 ¾ minutes.

Accordingly, a solid-state control circuit for an appliance such as a deep fat fryer whereby the appliance is selectively operative in a "cook" mode, a lower temperature "hold" mode, a fat "melt" mode and a safety thermostat and safety contactor "test" mode has been shown and described.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:
1. In a deep fat fryer having means for establishing a DC voltage differential between a DC power supply line and a reference power supply line and having means including at least two AC power supply lines and one or more heating elements coupled thereto for heating a reservoir of cooking fat, a solid-state control circuit comprising:

means coupled to said DC power supply line and said reference power supply line for developing a reference bias potential;

means including operating temperature control means for selecting the temperature at which said cooking fat is to be maintained and means for sensing the temperature of said cooking fat, said temperature control means and said temperature sensing means being coupled in series between said DC power supply line and said reference power supply line and combining to develop an operating bias potential at the junction between said operating temperature control means and said temperature sensing means, the operating bias potential varying responsive to changes in the temperature of said cooking fat to correspond to the temperature of said cooking fat;

means including a voltage comparator coupled to said reference bias means and said operating bias means for comparing the operating bias potential and the reference bias potential and developing an enabling signal whenever the level of the operating bias potential relative to the level of the reference bias potential indicates that the temperature of said cooking fat is below the temperature selected by said operating temperature control means;

said comparator having positive and negative inputs and an output, the positive input of said comparator being coupled to said reference bias means and having the reference bias potential coupled thereto and the negative input of said comparator being coupled to the junction between said operating temperature control means and said temperature sensing means and having the operating bias potential coupled thereto, said comparator developing a low logic level enabling signal at said output whenever the operating bias potential exceeds the reference bias potential;

said temperature sensing means comprises a negative temperature coefficient (NTC) resistive sensor coupled between said operating temperature control means and said reference power supply line, the resistance of said sensor varying inversely with respect to changes in the temperature of said cooking fat to increase the operating bias potential coupled to said comparator such that the operating bias potential exceeds the reference bias potential and said comparator develops a low logic level enabling signal when the temperature of said cooking fat is below the selected temperature level; and means coupled to said reference bias means and said operating temperature control means for switching said deep fat fryer to operation in a hold mode wherein said cooking fat is maintained at a reduced temperature independently of the temperature selected by said operating temperature control means, said hold mode means altering the reference bias potential and the operating bias potential coupled to said comparator to correspond to the reduced temperature and said comparator developing the enabling signal during operation in the hold mode whenever the level of the altered operating bias potential relative to the level of the altered reference bias potential corresponds to a cooking fat temperature that is below the reduced temperature level.

2. A solid-state control circuit in accordance with claim 1 wherein said reference bias means comprises a plurality of resistors coupled in a voltage divider between said DC power supply line and said reference power supply line and wherein said hold mode means comprises first normally conductive solid-state means coupled in parallel with one of the said plurality of resistors to short said one resistor and second normally off solid-state means coupled in parallel with said operating temperature control means, said hold mode means including timing means for biasing said first solid-state means off and said second solid-state means to conduction to respectively unshort said one resistor and simultaneously short said operating temperature control means at the end of a predetermined time interval during which said deep fat fryer is not in use, and further including automatic resetting means for automatically resetting said timing means to initiate a new predetermined time interval if said deep fat fryer is used before the prior predetermined interval has elapsed.

3. A solid-state control circuit in accordance with claim 2 wherein said timing means comprises oscillator means for generating a series of output pulses at a predetermined frequency, binary counter means having a clock input coupled to said oscillator means and having a plurality of outputs switchable between low logic level states and high logic level states to represent a corresponding count of the number of pulses coupled to said counter, gating means coupled to said binary counter means outputs for decoding the counter output states to provide a single pulse when the counter output states correspond to the end of the predetermined time interval, and bistable means having a reset input coupled to said gating means and a first output coupled to said first solid-state means and said second solid-state means, said bistable means being normally set to bias said first solid-state means on and said second solid-state means off, the single pulse coupled to the reset input of said bistable means at the end of the predetermined time interval resetting said bistable means to bias said first solid-state means off to unshort said one resistor and bias said second solid-state means to conduction to short said operating temperature control means, said deep fat fryer thereafter being operative to maintain said cooking fat at the reduced temperature level until said bistable means is set.

4. A solid state control circuit in accordance with claim 3 wherein said binary counter means includes a reset input, wherein said reference bias means also provides a second reference bias potential which is higher than the first reference bias potential, and wherein said automatic resetting means comprises a third comparator having a positive input coupled to said operating bias means such that the operating bias potential is coupled to said positive output, a negative input coupled to said reference bias circuit and biased by the second reference bias potential, and an output coupled to the reset input of said binary counter means, the operating bias potential increasing responsive to said temperature sensing means to exceed said second reference bias potential when said deep fat fryer is used before the predetermined time interval has elapsed and enabling said third comparator to develop a reset signal at said output for automatically resetting said counter means to initiate a new predetermined time interval.

5. A solid-state control circuit in accordance with claim 3 or 4 wherein said bistable means comprises a "D" flip/flop further having a clock input, a "D" input and a second output, said "D" input and said second output being interconnected such that said first output changes states between a low logic level state and a high logic level state responsive to pulses supplied to said clock input, and wherein said hold mode means includes means for manually switching said deep fat fryer between operation at the selected temperature and the reduced temperature of the hold mode, said manual hold mode switching means comprising normally open control switch means coupled to said DC power supply line and monostable multivibrator means coupled between said normally open control switch means and the clock input of said flip/flop, said monostable multivibrator providing a pulse to said flip/flop clock input responsive to manual closure of said control switch means to cause said first flip/flop output to change states, said first flip/flop output also being coupled to said oscillator means and said binary counter means to reset said oscillator means and said counter means to initiate a new predetermined time interval, said pulse from said monostable multivibrator causing said flip/flop to bias said first solid-state means off to unshort said one resistor and said second solid-state means on to short said operating temperature control means to switch said deep fat fryer to operation in the hold mode at the lower temperature level if said control switching means is manually depressed while said fryer is operating at the selected temperature level and said pulse causing said flip/flop to bias said first solid-state means on and said second solid-state means off if said control switch means is manually depressed while said fryer is operating in the hold mode at the reduced temperature level.

6. A solid-state control circuit in accordance with claim 5 including an indicator light, a triac coupled in series with said indicator light between said AC power lines and having a control input, and a transistor having an input coupled to the second output of said flip/flop and an output coupled to the control input of said triac, said flip/flop biasing said transistor to conduction to turn said triac on and connect said indicator light across said AC power lines when said fryer is being operated in the hold mode at the reduced temperature level, said indicator light thereupon lighting to give a visual indication that said fryer is operating at the reduced temperature level.

7. A solid-state control circuit in accordance with claim 3 including means selectively operable to switch said deep fat fryer to operation in a melt mode wherein said heating elements are cycled on and off to melt said cooking fat when said cooking fat is unmelted, said fat melt means comprising second bistable means having a clock input coupled to a first one of said counter means outputs, a reset input coupled to a second one of said counter means outputs, and an output, third solid-state means having an output coupled in parallel with said temperature sensing means and an input coupled to the output of said second bistable means, second melt control switch means coupled to said second bistable means for enabling operation in the fat melt mode and means coupled to said oscillator means and said binary counter means when said second bistable means is enabled, said second bistable means biasing said third solid-state means to conduction to short said temperature sensing means and couple said operating temperature control means to said reference power supply line when the first output of said counter means supplies a pulse to the clock input of said second bistable means at a first predetermined time interval after said oscillator means and said binary counter means are reset, said third solid-state means shorting said temperature sensing means during a subsequent second predetermined time interval to inhibit said first comparator from developing the enabling signal, said second counter means output providing a reset pulse to the reset input of said second bistable means after said second predetermined time interval to inhibit further pulses to the clock input of said second bistable means from turning said third solid-state means off during a subsequent third predetermined time interval, odd numbered ones of said clock pulses thereafter being effective to turn said third solid-state means off such that said first comparator generates the enabling signal and reset pulses subsequent to said odd numbered clock pulses causing said second bistable means to turn said third solid-state means on such that the enabling signal cannot be generated by said first comparator, said first comparator being allowed to cycle on for relatively short intervals to energize said heating elements and melt said cooking fat.

8. A solid-state control circuit in accordance with claim 7 wherein said first bistable means and said second bistable means have respective set inputs and wherein said second melt control switch means is coupled to said DC power supply line and operable to couple said second bistable means set input to said DC power supply line in a first switch position and said first bistable means to said DC power supply line in a second switch position, said second melt control switch being normally closed to the first switch position to disable said second bistable means and manually actuable to close to the second switch position to enable said second bistable means and initiate operation in the fat melt mode.

9. A solid-state control circuit in accordance with claim 8 including solid-state means for disabling said first comparator if said timing means fails, said solid-state disabling means having an output coupled in parallel with said temperature sensing means and having an input coupled to said DC power supply line through said second melt control switch means in the second fat melt switch position, a capacitor coupled to said input and having a discharge path comprising a diode coupled between said input and said third solid-state means coupled in parallel with said temperature sensing means, said capacitor being charged during intervals when said first comparator is developing the enabling signal and discharging through said diode and said third solid-state means during intervals when no enabling signal is being developed, said capacitor continuing to charge to bias said solid-state disabling means to conduction to short said temperature sensing means and inhibit said first comparator from developing the enabling signal if said timing means fails.

10. A solid-state control circuit in accordance with claim 8 including solid-state means for inhibiting reset pulses to said counter means during operation in the melt mode, said counter reset inhibiting means having an input coupled to said DC power supply line through said second melt control switch means when said second melt control switch means is closed to the second fat melt switch position and an output coupled the reset input of said binary counter means, said counter reset inhibiting means being biased to conduction to inhibit reset pulses to said counter means when said second melt control switch means is closed the second fat melt switch position.

11. A solid-state control circuit in accordance with claim 8 including solid-state means for inhibiting reset pulses to said second bistable means during operation in modes other than the melt mode, said second bistable reset inhibiting means having an input coupled the set input of said second bistable means and an output coupled to the reset input of said second bistable means, said second bistable reset inhibiting means being coupled to said DC power supply line through said second melt control switch means when said second melt control switch means is in the first switch position, said second bistable reset inhibiting means being biased to conduction to inhibit reset pulses to said second bistable means and disable said second bistable means when said deep fat fryer is not operating in the fat melt mode.

12. A solid-state control circuit in accordance with claim 8 including an indicator light, and wherein said second melt control switch means includes switch means coupled in series with said indicator light between said AC power lines, said switch means being ganged with said second melt control switch means to close when said second melt control switch means is manually switched to the first switch position and connect said indicator light across said AC power lines to provide a visual indication that said deep fat fryer is being operated in the fat melt diode.

* * * * *